United States Patent [19]
Yang

[11] Patent Number: 5,306,996
[45] Date of Patent: Apr. 26, 1994

[54] AC/DC STEPPED DRIVE SYSTEM

[76] Inventor: Tai-Her Yang, 5-1 Taipin St., Si-Hu Town, Dzan-Hwa, Taiwan

[21] Appl. No.: 887,484

[22] Filed: May 21, 1992

Related U.S. Application Data

[60] Continuation-in-part of Ser. No. 599,054, Oct. 17, 1990, abandoned, which is a division of Ser. No. 258,088, Oct. 17, 1988, Pat. No. 4,962,583, which is a continuation of Ser. No. 426,188, Sep. 28, 1982, abandoned.

[51] Int. Cl.$^5$ .............................. H02P 1/04
[52] U.S. Cl. .................. 318/716; 318/721; 318/732; 318/771; 318/138
[58] Field of Search ........ 318/138, 254, 439, 701–798; 310/112, 89, 154, 68 B, 46, 177, 179, 191, 207, 268, 230, 220, 114, 230

[56] References Cited

U.S. PATENT DOCUMENTS

| | | | |
|---|---|---|---|
| 3,789,282 | 1/1974 | Hara | 310/148 |
| 3,900,779 | 8/1975 | Kondratenko | 318/197 |
| 3,909,684 | 9/1975 | Smith, Jr. | 318/138 |
| 3,946,260 | 3/1976 | Frezzolini et al. | 310/112 |
| 4,035,701 | 7/1977 | Jensen | 318/226 |
| 4,039,909 | 8/1977 | Baker | 318/197 |
| 4,206,395 | 6/1980 | Okuyama et al. | 318/716 |

*Primary Examiner*—Paul Ip
*Attorney, Agent, or Firm*—Leonard Bloom

[57] ABSTRACT

A switched stepping motor for use in a computer-controlled processing system, the motor being capable AC or DC operation in a continuous or stepwise manner for completing a variety of operations such as lathe cutting, drilling, planning, milling, abrading, and boring.

15 Claims, 4 Drawing Sheets

| S\D | 0° | 60° | 120° | 180° | 240° | 300° | 0° | 60° | 120° |
|---|---|---|---|---|---|---|---|---|---|
| Q1 | ON | | | ON | | | ON | | |
| Q2 | | ON | | | ON | | | ON | |
| Q3 | | | ON | | | ON | | | ON |
| Q4 | | | | ON | ON | ON | | | |
| Q5 | ON | ON | ON | | | | ON | ON | ON |
| Q6 | ON | ON | ON | | | | ON | ON | ON |
| Q7 | | | | ON | ON | ON | | | |

S: SWITCH   D: DEGREES

| S \ D | 0° | 60° | 120° | 180° | 240° | 300° | 0° | 60° | 120° |
|---|---|---|---|---|---|---|---|---|---|
| Q1 | ON |  |  | ON |  |  | ON |  |  |
| Q2 |  | ON |  |  | ON |  |  | ON |  |
| Q3 |  |  | ON |  |  | ON |  |  | ON |
| Q4 | ON | ON | ON |  |  |  | ON | ON | ON |
| Q5 |  |  |  | ON | ON | ON |  |  |  |
| Q6 |  |  |  | ON | ON | ON |  |  |  |
| Q7 | ON | ON | ON |  |  |  | ON | ON | ON |
S: SWITCH   D: DEGREES
FIG. 5
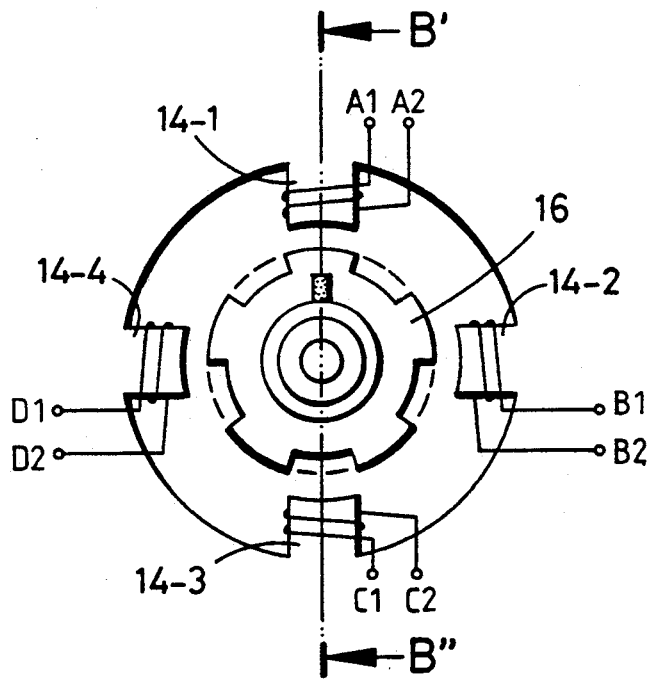
FIG. 6
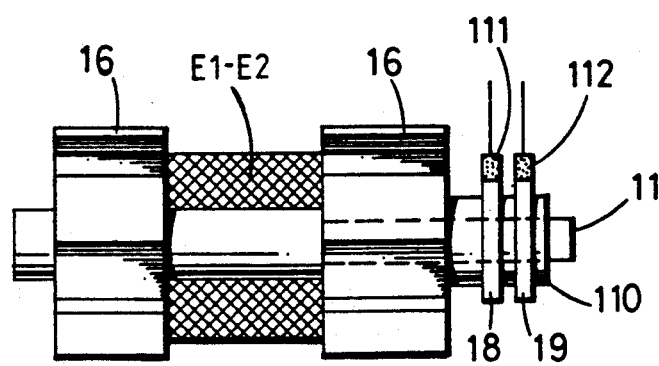
FIG. 7

AC/DC STEPPED DRIVE SYSTEM

CROSS-REFERENCE TO RELATED APPLICATION

The present application is a continuation-in-part application of U.S. application Ser. No. 599,054 filed Oct. 17, 1990, abandoned, which is a division application of U.S. application Ser. No. 258,088 filed Oct. 17, 1988, now Pat. No. 4,962,583, issued Oct. 16, 1990, which is a continuation of U.S. Ser. No. 426,188 filed Sep. 28, 1982, abandoned.

BACKGROUND OF THE INVENTION

Field of the Invention

The present invention relates to electric machines and, more particularly, to a drive system including a stepping motor and switching circuit capable of generating a stepped-drive output from an AC or DC power source.

Description of the Background

Simplicity and standardization are the basic prerequisites in mass production of industrial products. Without them the main mechanical processing machine, such as a lathe or a milling machine, in an automatic processing system must be individually designed to meet the requirements of different workpieces, products, and/or processing procedures.

In cases where the workpieces or processing procedures vary greatly, the flexibility of the main processing machine may be severely limited. This is often the case with processing systems which operate on larger workpieces.

For this reason, a flexible computer-controlled "Group" type processing system was shown and described in the parent U.S. patent application Ser. No. 258,088 filed Oct. 17, 1988 (which is in turn a continuation of U.S. patent application Ser. No. 426,188 filed Sep. 28, 1982), see also European Patent Publication No. 0207298, published on Jun. 13, 1990, which claims convention priority based on the above-referenced U.S. patent application Ser. No. 426,188.

It is necessary in such computer-controlled systems to provide precision electric machines to translate software commands into mechanical output for manipulating each of the interface devices. A common electric machine used for this purpose is the "stepping" motor. However, conventional stepping motors cannot achieve the flexibility required in the above-referenced computer-controlled "Group" type processing system.

SUMMARY OF THE INVENTION

It is an object of the invention to provide a flexible stepped drive system for use in a computer-controlled "Group" type processing system as set forth in the parent U.S. patent application Ser. No. 258,088 filed Oct. 17, 1988 (which is in turn a continuation of U.S. patent application Ser. No. 426,188 filed Sep. 28, 1982).

It is a specific object of the invention to provide a stepped drive system as described above which is capable of being AC or DC-driven in a continuous or stepwise manner, such system being suitable for use in a multi-purpose processing machine for completing a variety of operations such as lathe cutting, drilling, planning, milling, abrading, and boring.

According to the present invention, a stepped drive system is disclosed. The system includes a housing and a stator attached interiorly of the housing. The stator further includes a stator core having a plurality of salient poles projecting interiorly of the housing and arranged in diametric pairs, each stator pole having a corresponding stator winding wound thereabout. The system also includes a rotor rotatably mounted within the housing, the rotor further comprising an axle rotatably supported by the housing, a first rotor core mounted on the axle and having a plurality of poles extending radially therefrom, a rotor winding wound about the first rotor core, and a pair of conductive slip rings both mounted on the axle and electrically connected to the rotor winding. The system also includes a brush assembly for rotatable electrical contact with said slip rings, and a switching circuit for conducting power from a source input to said stator windings, and to said rotor windings via said brush assembly. The switching circuit further comprises a number of switch devices each connected in series with two series-connected stator windings wound about a diametric pair of stator poles, the switch devices allowing selective application of a source input to the two series-connected stator windings. The switching circuit also includes a number of switch devices coupled to the rotor winding for selectively applying the source input thereto according to positive or negative polarity.

BRIEF DESCRIPTION OF THE DRAWINGS

Other objects, features, and advantages of the present invention will become more apparent from the following detailed description of preferred embodiments and certain modifications thereof when taken together with the accompanying drawings in which:

FIG. 5 is a commutation table which illustrates the switch sequence necessary to generate reverse rotation relative to FIG. 4;

FIG. 6 shows a side cut-away view of an alternate embodiment of the AC stepping motor according to the present invention;

FIG. 7 shows a front cut-away view taken along the line B'-B" of FIG. 1.

DETAILED DESCRIPTION OF THE PREFERRED EMBODIMENT

Figure 1:
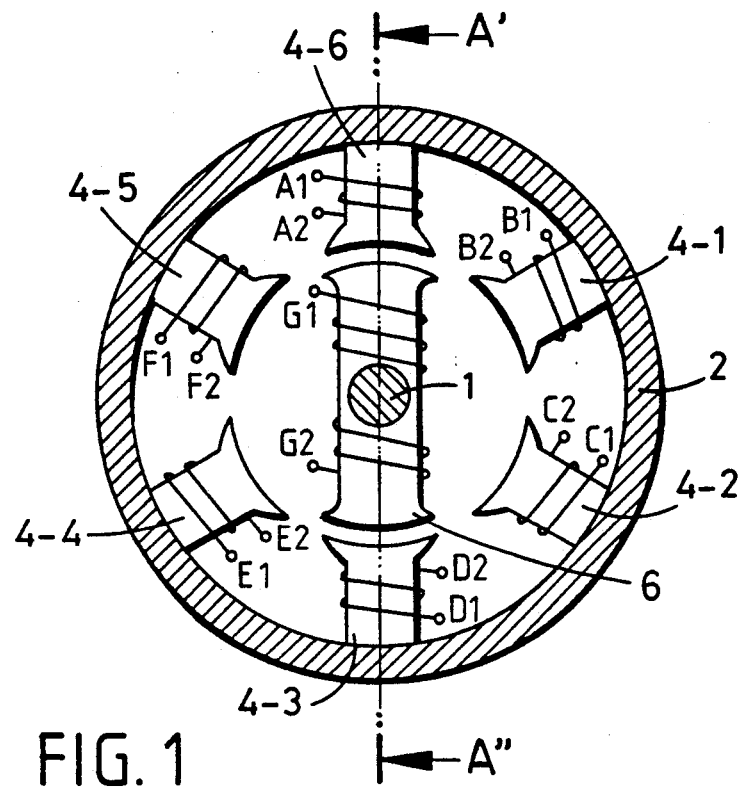
FIG. 1 shows a side cut-away view of one embodiment of the AC stepping motor according to the present invention.
Figure 2:
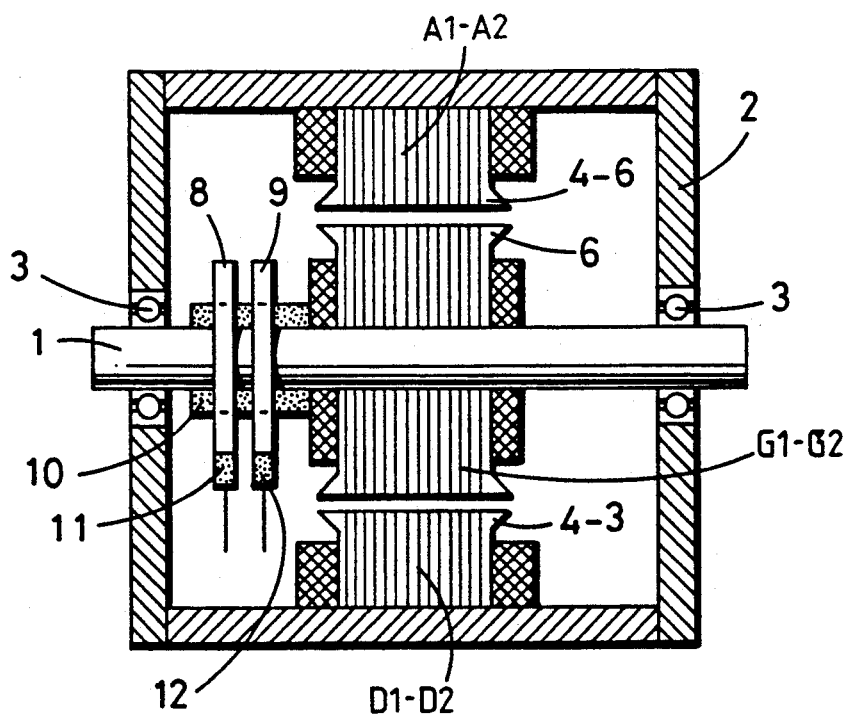
FIG. 2 shows a front cut-away view taken along the line A'-A" of FIG. 1.

FIGS. 1 and 2 show a side cut-away view and a front cut-away view, respectively, of one embodiment of the AC stepping motor according to the present invention. The cut-away view of FIG. 2 is taken along the line A'-A" of FIG. 1.

The stepping motor of FIGS. 1 and 2 includes a rotor comprising a two-pole salient rotor core 6 mounted on an axle 1. Rotor core 6 is wound by a rotor winding G1–G2.

A stator is also provided, the stator further including a housing 2 and six salient stator poles 4-1..6 equally spaced and projecting within housing 2. The stator poles 4-1..6 are each wound with a corresponding one of stator windings A1-A2, B1-B2, C1-C2, D1-D2, E1-E2, and F1-F2. An alternative number of stator poles 4-1..n may be used.

Axle 1 is rotatably seated in bearing set 3 for rotation within housing 2.

A brush assembly is also provided for commutation, the brush assembly further comprising a pair of slip rings 8 and 9 mounted coaxially on drive axle 1. Each slip ring 8 and 9 is connected to a corresponding end of rotor winding G1-G2. An insulating collar 10 underlies the slip rings 8 and 9 and electrically insulates them from drive axle 1. A pair of brushes 11 and 12 is also provided to maintain rotating conductive contact with slip rings 8 and 9.

Figures 3, 4:
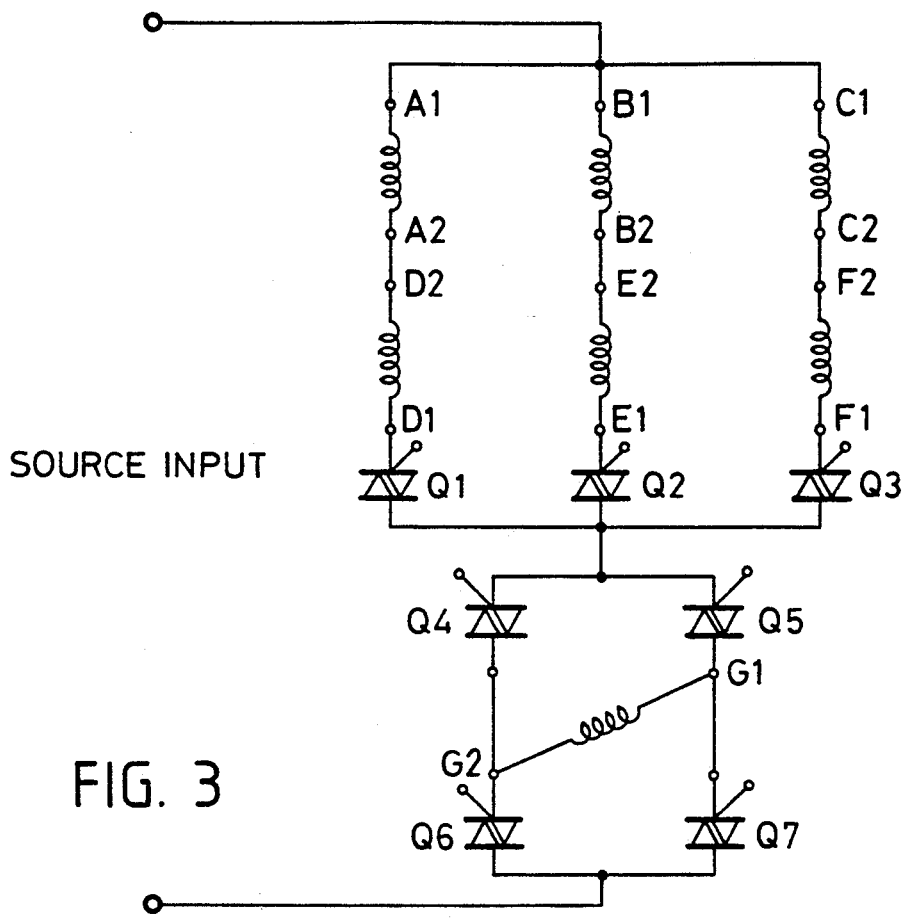
FIG. 3 is a schematic diagram of a switching circuit for driving the stepping motor of FIGS. 1 and 2.
FIG. 4 is a commutation table which illustrates the switch sequence necessary to generate 60° incremental rotation of the rotor of FIGS. 1 and 2.

FIG. 3 shows a switching circuit for driving the stepping motor of FIGS. 1 and 2. In FIG. 3, the rotor winding G1-2 is connected with the stator windings A1-2, B1-2, C1-2, D1-2, E1-2, and F1-2 in a series configuration. Specifically, the switching circuit of FIG. 3 comprises three parallely-connected stator switch legs each including two stator windings of diametric stator poles connected in series with one of switch devices Q1, Q2, or Q3. Specifically, a first switch leg includes stator winding A1-A2 connected in series with stator winding D1-D2 which is in turn connected in series with switch device Q1. A second switch leg includes stator winding B1-B2 connected in series with stator winding E1-E2 which is in turn connected in series with switch device Q2. A third switch leg includes stator winding C1-C2 connected in series with stator winding F1-F2 which is in turn connected in series with switch device Q3. The three parallel stator switch legs are connected in series with two parallel rotor switch legs to yield a series excitation motor. Each rotor switch leg further comprises a pair of switch devices Q4 and Q6 and Q5 and Q7. As shown, rotor winding G1-2 is coupled between the interconnection of Q4 and Q6 and the interconnection of Q5 and Q7.

It should be noted that the stator switch legs may alternatively be coupled to the rotor switch legs to yield a shunt or compound excitation motor, as will be described.

FIG. 4 is a commutation table which illustrates the switch sequence necessary to generate 60° incremental rotation of the rotor of FIGS. 1 and 2. Activation of each switch device Q1-Q7 is represented by the term "ON" in the corresponding row, and the switch devices Q1-Q7 remain deactivated at all other times. The switch sequence is divided into six sequential time intervals each corresponding to 60° of motor rotation to yield one full 360° revolution. The switching circuit of FIG. 3 may be switched to operate the motor of FIGS. 1 and 2 incrementally in a stepwise manner or continuously in a synchronous manner by continuous repetition of the illustrated switch sequence.

The operation of the stepping motor of the present invention will be described with reference to FIGS. 1-4.

A source input is applied to the switching circuit of FIG. 3, and the switch devices Q1-Q7 are switched according to the sequence of FIG. 4. The rotor excitation signal applied to rotor winding G1-G2 by switching of switch devices Q4-Q7 through the slip rings 8 and 9. The stator excitation signal is applied directly to the stator windings A1-A2, B1-B2, C1-C2, D1-D2, E1-E2, and F1-F2.

A primary advantage follows from the combination of the motor of FIGS. 1 and 2 when excited by the switching circuit of FIG. 3 in accordance with the sequence of FIG. 4. The motor may be driven from an AC or DC source input. Regardless of the source input polarity, the polarity of the excitation signals applied to the stator windings A1-2, B1-2, C1-2, D1-2, E1-2, and F1-2 relative to the rotor winding G1-2 will remain constant. Hence, the polarity of the source input to the switching circuit of FIG. 3 may be varied without affecting the attraction between poles. Moreover, the polarity relation may be varied simply by altering the commutation sequence to that shown in FIG. 5.

The three parallel stator switch legs are connected in series with two parallel rotor switch legs to yield a series excitation motor. Each rotor switch leg further comprises a pair of switch devices Q4 and Q6, Q5 and Q7. As shown, rotor winding G1-2 is coupled between the interconnection of Q4 and Q6 and the interconnection of Q5 and Q7.

It should be noted that the stator switch legs may alternatively be coupled to the rotor switch legs to yield a shunt or compound excitation motor, as will be described.

FIGS. 6 and 7 show a side cut-away view and a front cut-away view, respectively, of an alternate embodiment of the AC stepping motor according to the present invention. The cut-away view of FIG. 7 is limited to the rotor and is taken along the line B'-B" of FIG. 6.

As shown, the rotor of FIGS. 6 and 7 is in a dumbbell configuration and includes opposing rotor cores 16 mounted on an axle 11.

A stator is also provided, the stator further including two sets of four salient stator poles 14-1..4, each set corresponding to one of the rotor cores 16. The stator poles 14-1..4 are equally spaced and project within the housing. The stator poles 14-1..4 are each wound with a corresponding one of stator windings A1-A2, B1-B2, C1-C2, and D1-D2.

A brush assembly is also provided for commutation, the brush assembly further comprising a pair of slip rings 18 and 19 mounted coaxially on drive axle 11. Each slip ring 18 and 19 is connected to a corresponding end of rotor winding E1-E2. An insulating collar 110 underlies the slip rings 18 and 19 and electrically insulates them from drive axle 11. A pair of brushes 111 and 112 is also provided to maintain rotating conductive contact with slip rings 18 and 19.

Figure 8:
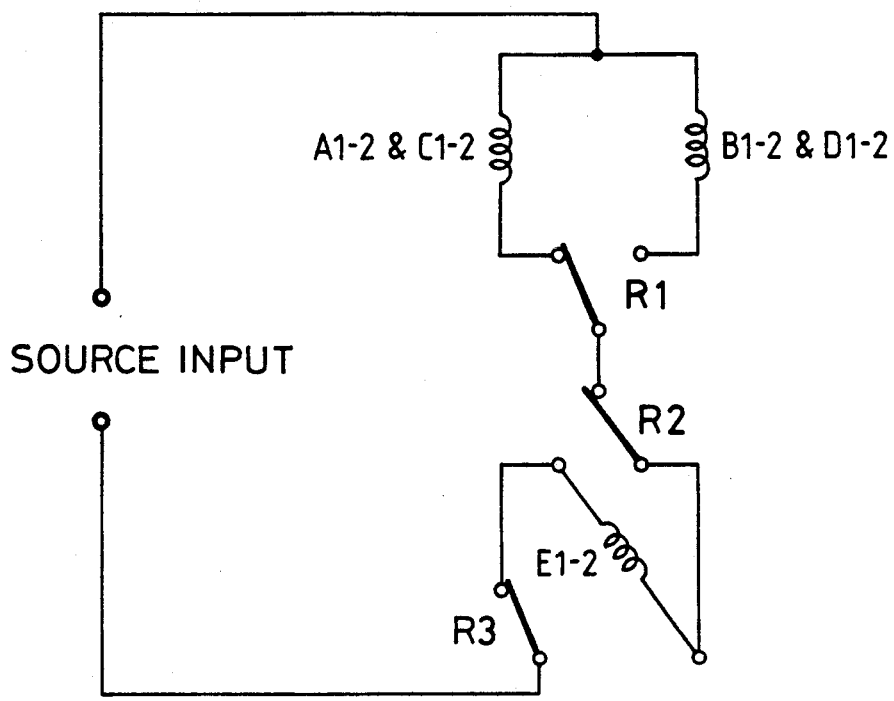
FIG. 8 shows a switching circuit for driving the stepping motor of FIGS. 6 and 7.

FIG. 8 shows a switching circuit for driving the stepping motor of FIGS. 6 and 7. In FIG. 8, the stator windings A1-2 and C1-2 are connected in series, as are the stator windings B1-2 and D1-2.

The rotor winding E1-2 is connected with the stator windings A1-2, B1-2, C1-2, and D1-2 in a series configuration. More specifically, the switching circuit of FIG. 8 comprises two parallely-connected stator switch legs each including two stator windings of diametric stator poles. A first switch leg includes stator windings A1-A2 connected in series with stator winding C1-C2. A second switch leg includes stator winding B1-B2 connected in series with stator winding D1-D2. A rotor switch leg including rotor winding E1-2 may be selectively connected in series to either of the two stator switch legs through a single-pole double-throw relay R1. The rotor switch leg also includes two single-pole double-throw polarity reversing relays R2 and R3 connected as shown to yield a series excitation motor.

Figure 9:
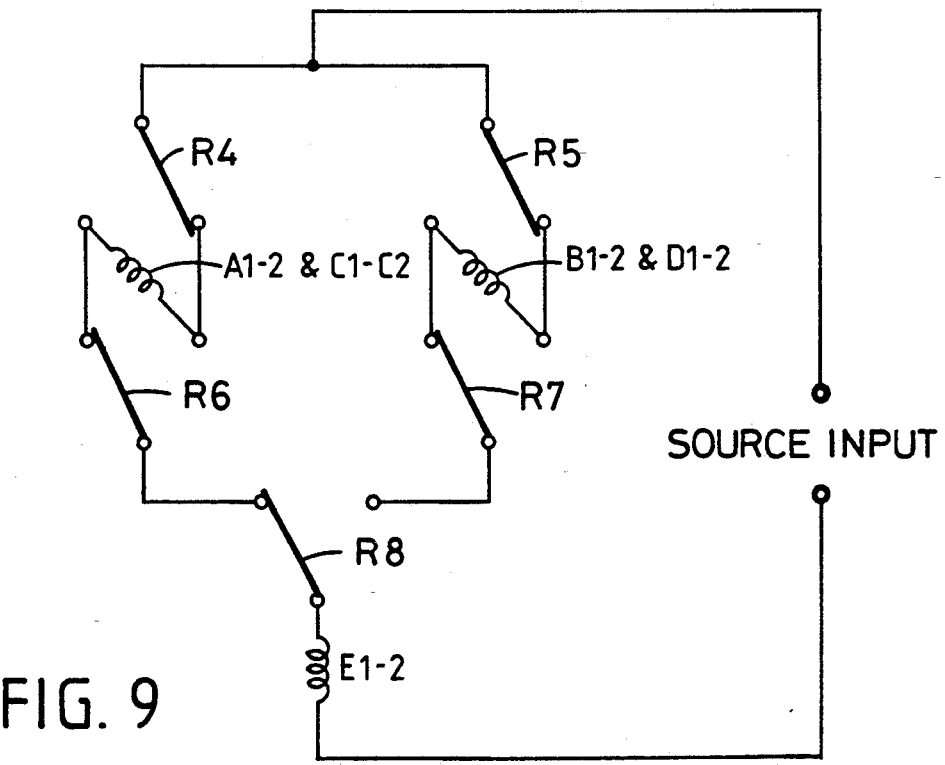
FIG. 9 shows an alternative switching circuit for driving the stepping motor of FIGS. 6 and 7.

FIG. 9 shows an alternative embodiment of the switching circuit of FIG. 8. The switching circuit of FIG. 9 is much the same as that of FIG. 8 except that two pair of polarity reversing relays R4 and R6, R5 and R7 are connected as shown to the respective series-coupled stator windings A1-2, B1-2, C1-2, and D1-2 to selectively reverse the polarity of the excitation signal applied to each pair of windings A1-2 and C1-2, B1-2 and D1-2. The rotor winding E1-2 is selectively connected via relay R8 to either pair of stator windings A1-2 and C1-2 or B1-2 and D1-2.

Having now fully set forth the preferred embodiments and certain modifications of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

I claim:

1. A stepped drive system operable from an AC or a DC source input, comprising:
   a housing;
   a stator attached interiorly of said housing, said stator including a stator core having a plurality of salient poles projecting interiorly of said housing, said poles being arranged in diametric pairs and each having a corresponding stator winding wound thereabout;
   a rotor rotatably mounted within said housing, said rotor further comprising,
      an axle rotatably supported by said housing,
      a first rotor core mounted on said axle and having a plurality of poles extending radially therefrom,
      a rotor winding wound about said first rotor core, and
      a first conductive slip ring and a second conductive slip ring both mounted on said axle and electrically connected to said rotor winding;
   a brush assembly for rotatably electrical contact with said slip rings; and
   a switching circuit for conducting power from a source input to said stator windings, and to said rotor windings via said brush assembly, said switching circuit further comprising a first plurality of switch devices each connected in series with the stator windings about a diametric pair of stator poles for selectively applying said source input thereto, and a second plurality of switch devices coupling said rotor winding to said first plurality of switches for allowing application of said source input thereto according to a selected polarity.

2. The stepped drive system according to claim 1, wherein said plurality of stator poles further comprises six stator poles.

3. The stepped drive system according to claim 2, wherein said plurality of rotor poles further comprises two rotor poles.

4. The stepped drive system according to claim 1, wherein said plurality of stator poles further comprises four stator poles.

5. The stepped drive system according to claim 4, wherein said plurality of rotor poles further comprises five rotor poles.

6. The stepped drive system according to claim 5, further comprising a second rotor core mounted on said axle in a spaced relation to said first rotor core.

7. The stepped drive system according to claim 1, wherein first plurality of switch devices and second plurality of switch devices further comprise solid state bidirectional gated switches.

8. The stepped drive system according to claim 7, wherein first plurality of switch devices and second plurality of switch devices further comprise thyristors.

9. The stepped drive system according to claim 1, wherein first plurality of switch devices and second plurality of switch devices further comprise electromechanical relays.

10. A stepped drive system operable from an AC or DC source, comprising:
    a rotor having a pair of slip rings and a rotor winding connected to said slip rings;
    a stator having a plurality of pairs of diametric poles;
    a plurality of stator windings, one each of said stator windings being wound around one each of said stator poles;
    a plurality of commutating switches;
    a plurality of individual circuit legs corresponding in number to the number of said pairs of stator poles, each of said circuit legs including said stator windings about one of said pairs of diametric stator poles connected in series with each other and with one of said commutating switches;
    said circuit legs being connected in parallel with one another, and
    a plurality of reversing switches connecting said rotor winding through said slip rings in series with said parallel connected circuit legs whereby the direction of current flow from said parallel connected circuit legs into said rotor winding may be selectively reversed.

11. The stepped drive system according to claim 10, wherein said plurality of pairs of stator poles further comprises three stator pole pairs connected in three said circuit legs.

12. The stepped drive system according to claim 10, wherein said commutating and said reversing switches further comprise solid state bi-directional gated switches.

13. The stepped drive system according to claim 12, wherein said commutating and reversing switches further comprise thyristors.

14. The stepped drive system according to claim 10, wherein said commutating and reversing switches further comprise electromagnetic relays.

15. A stepped drive system operable from an AC or DC source, comprising:
    a rotor having a pair of slip rings and a rotor winding connected to said slip rings;
    a stator having two pairs of diametric poles;
    a plurality of stator windings, one each of said stator windings being wound around one each of said stator poles;
    a plurality of polarity reversing relays;
    a pair of individual circuit legs, each of said circuit legs including said stator windings about one pair of diametric poles connected in series with each other and between a pair of said polarity reversing relays, one each of said circuit legs being connected together; and
    a commutating relay connected between the ends of said circuit legs opposite said one end thereof and said rotor winding for selectively connecting said rotor winding in series with one of said circuit legs.

* * * * *